D. F. O'CONNELL.
AUTOMATIC SAFETY PULLEY.
APPLICATION FILED DEC. 11, 1916.

1,231,052.

Patented June 26, 1917.

UNITED STATES PATENT OFFICE.

DANIEL FAULKNER O'CONNELL, OF WINNIPEG, MANITOBA, CANADA.

AUTOMATIC SAFETY-PULLEY.

1,231,052.  Specification of Letters Patent.  Patented June 26, 1917.

Application filed December 11, 1916. Serial No. 136,288.

*To all whom it may concern:*

Be it known that I, DANIEL F. O'CONNELL, a citizen of the Dominion of Canada, residing at Winnipeg, in the Province of Manitoba, Canada, have invented a new and Improved Automatic Safety-Pulley, of which the following is a specification.

This invention, which has reference to rope or cable guide sheaves or pulleys, and particularly to that class known as safety or catch pulleys in which is included automatically operating means that grip the pull rope or cable, under certain manipulations of the said pull rope or cable, or when the said cable or rope is under a sudden slack, or breaks away from the hand of the operator.

My invention primarily has for its object, to provide a simple and inexpensive pulley of the character stated, so designed that it will work freely both ways and in which the catch devices operate to instantly check and grip the rope or cable, without the use of a third or special catch manipulating rope, incident in the practical application of other pulleys of the general type referred to.

My invention, therefore, further has for its object, to provide a safety pulley, the construction of which is such that adapts it for use with any size of rope, relatively to the size of the sheave, and with the catch or grip members so formed and coöperative with the sheave and the rope that the rope is not injured or torn under repeated actions of the said catch or grip member.

With other objects in view, that will hereinafter appear, my invention embodies, in a pulley of the character stated, the peculiar features of construction and novel combination of parts, which will be first explained in detail, specifically pointed out in the appended claims, and illustrated in the accompanying drawing, in which:

Fig. 3 is a side view of the pulley or sheave.

Fig. 4 is a transverse section thereof.

Fig. 5 is an edge view of the same,

Fig. 6 is a side elevation of the U-shaped catch member hereinafter specifically referred to.

Figures 3, 4, 5, 6:
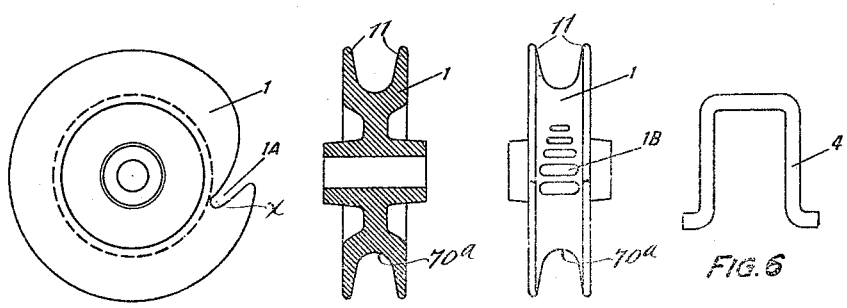

In carrying out my invention, I form the rope sheave or pulley 1 with curved catch grooves $1^A$ in the opposite flanges 11—11 thereof, as is best shown in Fig. 3, by reference to which it will be seen, the grooves $1^A$—$1^A$ constitute, as it were, curved slotways $x$ that extend through the said flanges 11—11 and near the base of the rope grooves $70^a$ and the said slotways are inclined with respect to the peripheral edge of the flanges 11—11, the reason for which will be presently explained.

2 designates a hanger for the pulley, preferably of strap iron, the ends of which are bent over to form side arms for the axle pin 3 on which the pulley 1 is mounted, and the said side arms have apertures in which the said pin is journaled.

The free ends of the side arms of the hanger strap are bent toward and abut each other, and the abutting members are provided with alining apertures in which is suspended a ring or becket 5, to which one end 71 of the lifting rope 70 is secured, as shown.

6 represents a hanging hook secured in the ceiling or other overhead support from which the hanger frame 2 is suspended.

Figures 1, 2, 7:
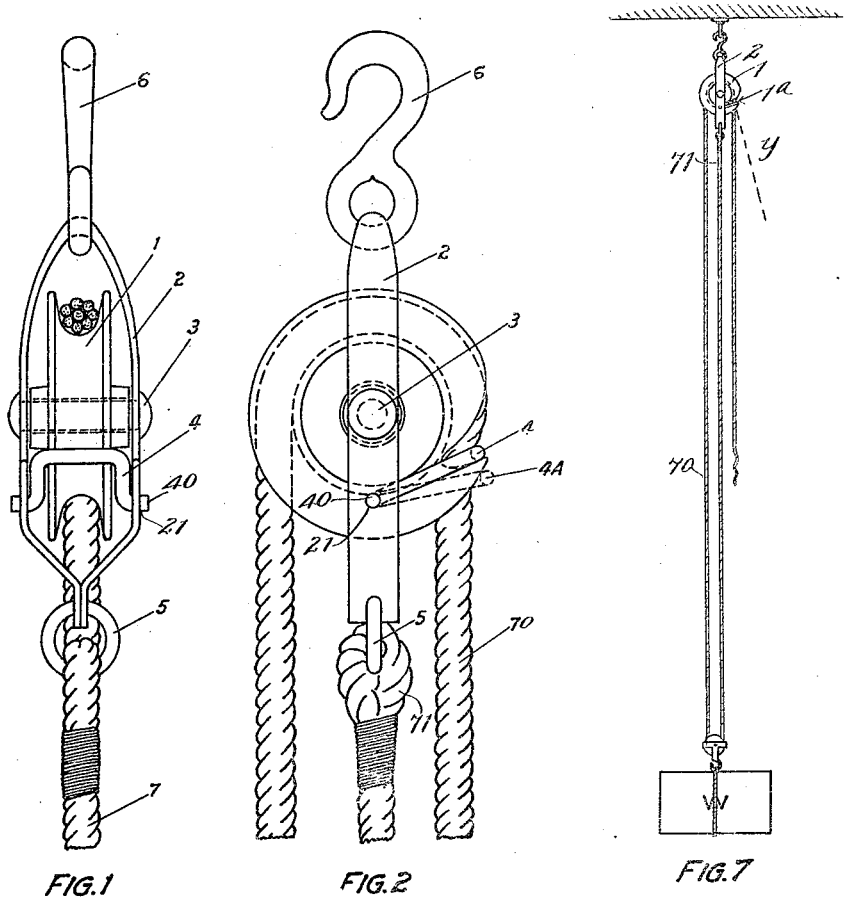
Figure 1 is an edge view of my improved construction of safety pulley as in use.
Fig. 2 is a side elevation of the parts shown in Fig. 1.
Fig. 7 is a diagrammatic side elevation of my improved safety pulley, the same being shown as operatively suspended from an overhead support.

The safety catch or rope grip, in my construction, is in the nature of a U-shaped member 4 of heavy steel rod and the ends of the said U-shaped body are bent at right angles to form hanger pintles 40 for rockably engaging bearing apertures 21 in the hanger 2, the said apertures being located in vertical alinement with the axis of the pulley and the hanger ring 5, as is clearly shown in Fig. 2 by reference to which it will be also seen that when it is desired to use the pulley 1, where a safety catch is not required, the said catch 4 may be pendently supported between the hanger sides and serve the purpose of an extra becket or hanger.

To hold the rope or cable from slipping while passing over the sheave, the said sheave is provided with a plurality of transverse corrugations 1ᴮ of gradually diminishing depth.

By reason of pivotally mounting the catch member 4 on the hanger frame 2 and forming the pulley with the grooves $x$ in the flanges thereof, as is best shown in Fig. 3, when the catch is applied for use, it always lies loosely on the pulling portion of the lifting rope or cable except when adjusted for gripping, it being round it does not wear or tear the rope by undue friction.

In operation, the weight W to be raised is attached to the lift rope, as shown in Fig. 7. After the weight is lifted to the required height by pulling on the pulling end of the rope, the operator has only to swing the said end of the rope at a slight angle (see broken lines $y$ on Fig. 7) and by gradually releasing the tension on the rope, causes the rope to engage the U-catch 4 and carry it from the normal position, indicated by dotted lines 4ᴬ on Fig. 2, to the full line position shown in the said Fig. 2, it begin understood that the catch 4 now causes the rope, as the sheave starts in the opposite direction, to bite against the edge portions 1ᵇ of the pulley flanges, it being understood that the more slack given to the pulling rope, the tighter will the U catch member close against the rope and thereby lock the sheave, and grip the rope as the pull tension increases in the said opposite direction.

Should the rope chance to slip from the operator's grasp or break, during the act of pulling the load, the catch device will automatically lock, since the sudden friction against the said U catch will be sufficient in itself to throw the catch 4 from the normal or loose position to the gripping position, as indicated in Fig. 2.

From the foregoing description taken in connection with the drawing, the complete operation and the advantages of my invention will be readily apparent, it being understood that my improved construction of pulley can be used for all purposes for which sling pulleys are needed, such as wire stretchers, clothes lines, hay carriers, &c.

The pulley can be made of different sizes with varying number of catch grooves to suit all requirements and with hooks, &c., for suspending merchandise from the ceiling for display purposes, &c.

What I claim is:

1. The combination with a hanger, a sheave journaled on the hanger, the said sheave having at least one inclined slot across the opposite flanged edges thereof, a rope gripper pivotally supported at one end on the hanger and having its opposite end adapted to normally hang loosely over the pulling rope that takes over the sheave, and adapted as the tension on the pulling rope is slackened and the sheave turned backward to frictionally engage the rope and clamp against the wall of the cross slot in the sheave.

2. The combination with a hanger, a sheave journaled on the hanger, the said sheave having at least one inclined slot across the opposite flanged edges thereof, a rope gripper pivotally supported at one end on the hanger and having its opposite end adapted to normally hang loosely over the pulling rope that takes over the sheave, and adapted as the tension on the pulling rope is slackened and the sheave turns backward to frictionally engage the rope and clamp against the wall of the cross slot in the sheave, the said rope gripper consisting of a U-shaped member having its free ends pivotally connected with the hanger to hang pendent thereon when not in operative connection with the rope and to straddle the said pulling rope and one edge of the cross slot in the sheave when at the operative position and adapted, as the sheave engaging pulling rope is drawn to freely ride on the said rope and when the sheave and the rope turn in opposite direction to frictionally engage the rope and lock it and the sheave from rotation in the opposite direction.

3. In a safety pulley of the character described; a hanger that includes opposite side members and means at the lower end for connection with the free end of a load lifting rope, a sheave journaled on and located within the side members of the hanger and over which the lifting rope passes, the said sheave having a cross slot that takes through the opposite flanges thereof and which is inclined to the axis thereof, and a rope clamp mounted on the hanger that normally straddles and loosely rides on the pulling end of the lifting rope, and which automatically moves into frictional engagement with the said rope and locks it and the sheave against backward rotation when the strain on the pulling end of the rope is released and the sheave and rope tend to turn backward.

4. In a safety pulley of the character described; a hanger that includes opposite side members and means at the lower end for connection with the free end of a load lifting rope, a sheave journaled on and located within the side members of the hangers and over which the lifting rope passes, the said sheave having a cross slot that takes through the opposite flanges thereof and which is inclined to the axis thereof, and a rope clamp mounted on the hanger that normally straddles and loosely rides on the pulling end of the lifting rope, and which automatically moves into frictional engagement with the said rope and locks it and the sheave against backward rotation when the strain on the pulling end of the rope is released and the sheave and rope tend to turn backward, the said clamp comprising a U-shaped member whose opposite ends terminate in pintles that journal in the side members of the hanger at a point below the sheave axis, the said U-shaped member straddling the rope and loosely engaging it as tension is on the pulling end thereof and adapted for gripping the rope whereby to lock the sheave and the rope from turning backward as tension on the pulling end of the rope is released.

Winnipeg, Manitoba, September 27th, 1916.

DANIEL FAULKNER O'CONNELL.